Patented Sept. 28, 1948

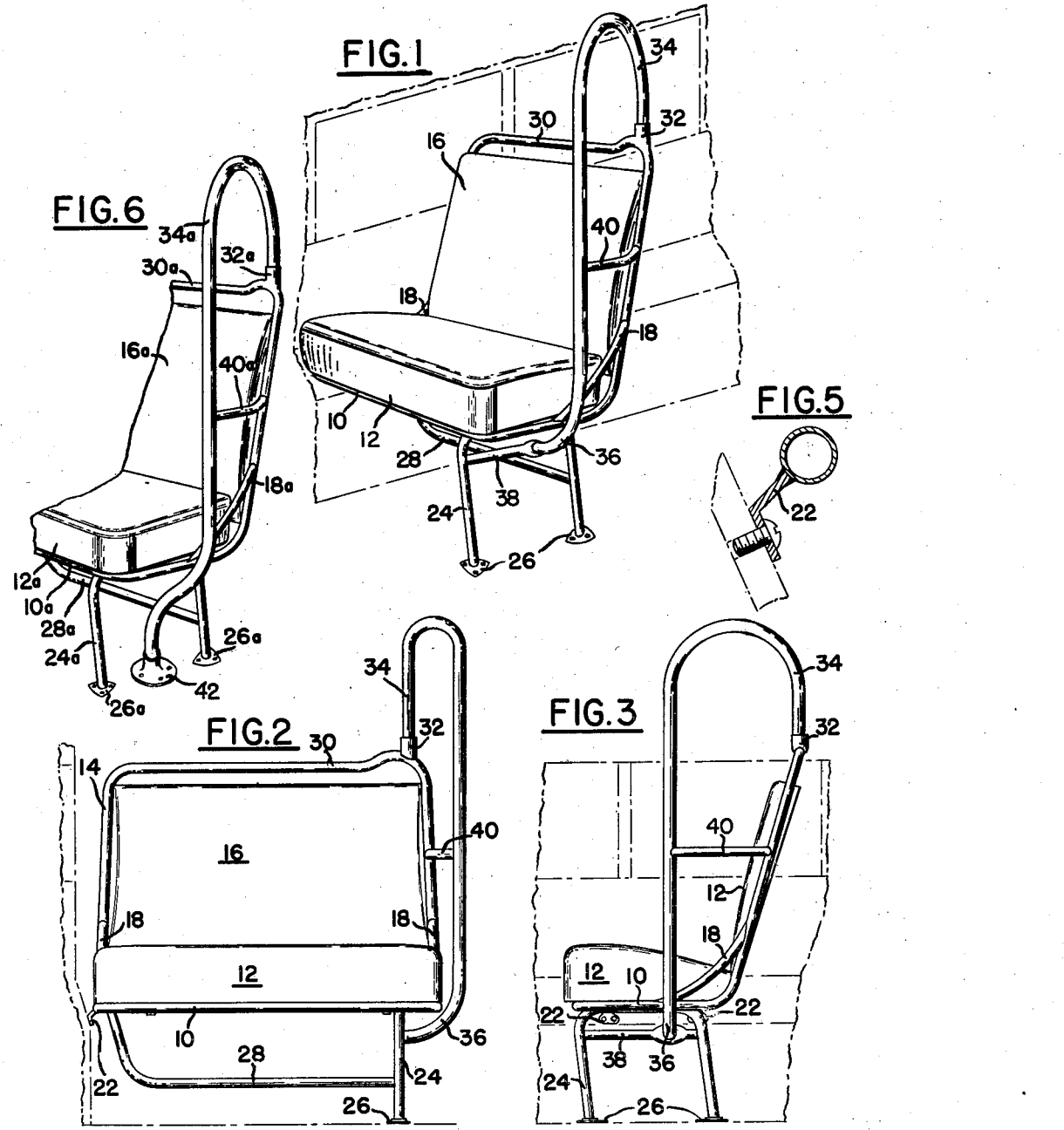

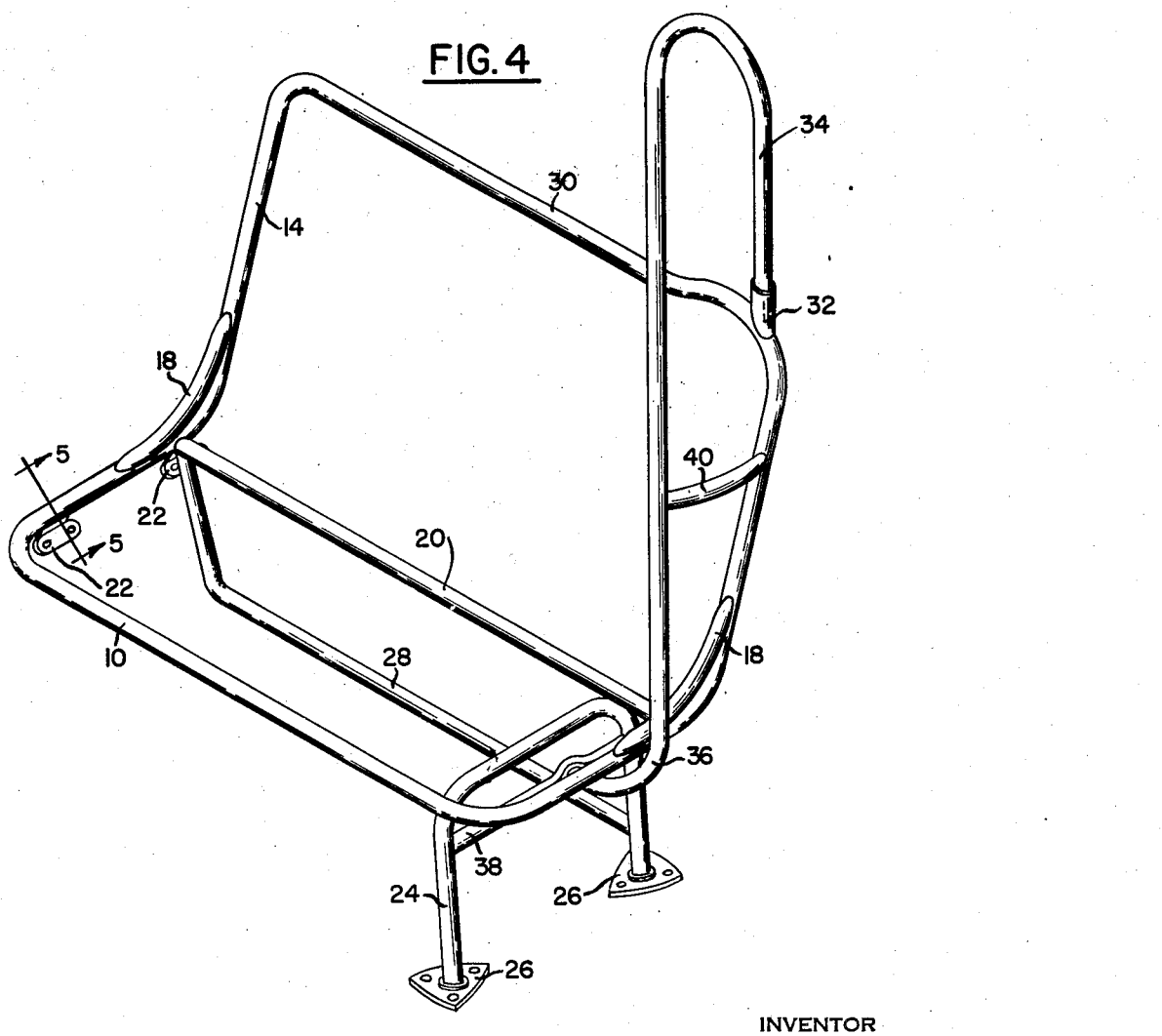

2,450,093

UNITED STATES PATENT OFFICE 2,450,093

COACH OR BUS SEAT

Harry C. Richardson, Troy, Ohio, assignor to The Troy Sunshade Company, Troy, Ohio, a corporation of Ohio Application December 23, 1946, Serial No. 717,919

7 Claims. (Cl. 155—1)

This invention relates to improvements in bus or coach seats, and particularly to an improved arrangement of a stanchion for standee passengers.

In the usual type bus or coach there are provided stanchions which extend from the floor to the ceiling of the vehicle, or there are provided longitudinally extending rails depending from the ceiling of the vehicle, or a combination of both for the convenience of the vehicle passengers who are standing. Sometimes, the stanchions extend vertically upwardly from the seat frame to the vehicle ceiling. Such members ordinarily require at least some support separate from the seats and thus require additional time and labor to install during the construction of the vehicle. Furthermore, and especially in the case of stanchions which extend to the vehicle ceiling, it is necessary to fit the stanchion in position and, unless the vehicle structure is rigid, means must be provided to permit relative movement between the opposite stanchion supports.

The present invention has as its primary object a seat construction for a bus or trolley coach, especially the latter, which has integral therewith a stanchion so that the seats and stanchions are both installed in one operation.

A further object of the present invention is to eliminate stanchions for standee passengers in coaches and buses which extend to the ceilings of the vehicles thereby providing a more convenient arrangement of the vehicle by leaving the entire upper part thereof free of all obstructions.

A still further object of this invention is to provide a bus or coach seat having a stanchion integrally formed therewith which extends forwardly along the side of the seat thereby defining the maximum aisle space for the vehicle.

These and other objects and advantages will become more apparent upon reference to the following description taken in connection with the accompanying drawings in which:

Figure 1 is a perspective view of a seat for a bus or trolley coach constructed according to this invention;

Figure 2 is a view looking in at the front of the seat shown in Figure 1;

Figure 3 is a view looking from the side thereof;

Figure 4 is a perspective view of the frame of the seat;

Figure 5 is a sectional view showing one of the supports which connects the seat with the vehicle at the wall side; and Figure 6 is a perspective view similar to Figure 1 but showing a modified form of stanchion.

Referring to the drawings, there is shown in Figures 1 through 4 a bus seat having a fabricated framework of tubing on which are supported the seat and back cushions. The framework consists of a member 10 which has a horizontally extending portion that supports the seat cushion 12 and also a vertically extending portion 14 which supports the back cushion 16. The frame 10 may be braced as by the braces 18 in order to prevent bending thereof under loads and also comprises the transverse brace 20. At the left side, looking from the front, the seat is secured to the vehicle wall by the brackets 22, best seen in Figure 5, and which are adapted for receiving screws or bolts which securely clamp that end of the seat to the vehicle wall.

At the aisle end of the seat there is preferably an inverted U-shaped member 24 which terminates in the foot members 26 through which screws or bolts may pass to secure the seat to the vehicle floor. Preferably, the member 24 is welded or brazed to the frame 10 and transverse braces may, if desired, be secured thereto by bolts or screws. The seat preferably includes the transverse bar 28 which extends from the rear leg of the member 24 across the back of the seat and is bent up to be fastened to the frame 10 at the opposite side. The bar 28 provides an additional brace for the seat construction and also provides a foot rail for the occupants in the next seat to the rear.

According to this invention the uppermost portion 30 of the frame 10, which is generally designated as a grab rail, has a fitting 32 secured thereto at the aisle side of the seat. The fitting 32 is adapted for receiving the end of the stanchion member 34 which extends upwardly from the fitting and bends toward the front of the seat and then extends vertically downwardly toward the vehicle floor. It will be noted from Figure 3 that the vertical portion of the stanchion toward the front of the seat is positioned substantially mid-way of the seat cushion 12. This is of assistance in defining the seating space and insures that there will be a maximum width aisle available at all times.

The lower end of the stanchion in Figures 1 through 5 is turned inwardly as at 36 and has its end secured to a bar 38 which is fastened between the legs of the member 24. Intermediate the upper and lower ends of the stanchion there is preferably a brace 40 which extends between the forward vertical reach of the stanchion 34 and the upright portion of the back frame 14.

The arrangement shown in Figure 6 is substantially identical with that shown in Figures 1 through 5 and similar parts bear corresponding numbers with the addition of a subscript a.

In Figure 6 the lower end of the stanchion member 34a is carried to the floor instead of being secured to the seat and is anchored by a mounting foot 42 through which bolts or screws may be passed into engagement with the vehicle floor.

According to usual practices, the frame members and stanchion are formed of tubing for the sake of economy, lightness and strength and may be plated or surface finished in any desirable manner.

It will be seen that this invention provides for an improved combination seat frame and stanchion arrangement which is readily installable in a bus or coach, which provides for maximum space within the vehicle, and which forms a relatively rigid although readily formed unit.

It will be understood that this invention is susceptible to modification in order to adapt it to different usages and conditions and, accordingly, it is desired to comprehend such modifications within this invention as may fall within the scope of the appended claims.

I claim:

1. In a vehicle seat; a frame comprising interconnected members including a grab rail along the top of said frame; a stanchion means for standee passenger use comprising a cylindrical member having one end rigidly connected with said grab rail at the aisle side thereof and extending upwardly and forwardly therefrom and then downwardly toward the vehicle floor, and a connection rigidly supporting the lower end of said cylindrical member from said frame.

2. In a vehicle seat having a frame with a lower portion for supporting a seat cushion and an upper portion for supporting a back cushion, said upper portion having a grab rail; a stanchion for standee passengers comprising a cylindrical member having one end rigidly connected with said grab rail at the aisle side thereof and extending upwardly therefrom, said stanchion then being bent forwardly and having the other end extending vertically downwardly between the front and back edges of the seat cushion; and supporting means for said other end of said stanchion rigidly connecting said last mentioned end to the lower portion of said frame.

3. In a vehicle seat having a frame with a lower portion for supporting a seat cushion and an upper portion for supporting a back cushion, said upper portion having a grab rail; a stanchion for standee passengers comprising a cylindrical member having one end rigidly connected with said grab rail at the aisle side thereof and extending upwardly therefrom, said stanchion then being bent forwardly and having the other end extending vertically downwardly between the front and back edges of the seat cushion; and means comprising an auxiliary member on said frame for rigidly supporting the said other end of said stanchion.

4. In a vehicle seat having a frame with a lower portion for supporting a seat cushion and an upper portion for supporting a back cushion, said upper portion having a grab rail; a stanchion for standee passengers comprising a cylindrical member having one end rigidly connected with said grab rail at the aisle side thereof and extending upwardly therefrom, said stanchion then being bent forwardly and having the other end extending vertically downwardly between the front and back edges of the seat cushion; and means comprising a mounting plate on the said other end of said stanchion adapted for being secured to the vehicle floor for rigidly supporting said stanchion.

5. In combination with a vehicle seat having a seat portion and a back portion; a stanchion for standee passenger use comprising a cylindrical member extending vertically along the aisle side of the seat and between the front and back edges of the seat portion and having its upper end bent backwardly and downwardly into engagement with said back portion, the top of said stanchion being approximately head-height relative to said seat; and means rigidly anchoring the lower end of said stanchion to said seat portion.

6. In combination with a vehicle seat having a seat portion and a back portion; a stanchion for standee passenger use comprising a cylindrical member extending vertically along the aisle side of the seat and between the front and back edges of the seat portion and having its upper end bent backwardly and downwardly into engagement with said back portion, the top of said stanchion being approximately head-height relative to said seat; means rigidly anchoring the lower end of said stanchion to said seat portion; and an auxiliary member extending substantially horizontally from said stanchion to said back portion as a brace and barrier member.

7. As a new article of manufacture; a stanchion for the standee passengers of vehicles such as buses and coaches comprising a cylindrical member bent to an inverted U shape with one leg thereof substantially longer than the other; means for rigidly securing the shorter leg to a vehicle seat and means for securing the longer leg to the portion of said vehicle seat adjacent to the floor of the vehicle.

HARRY C. RICHARDSON.

REFERENCES CITED

The following references are of record in the file of this patent:

UNITED STATES PATENTS

| Number | Name | Date |
| --- | --- | --- |
| 965,972 | Wing et al. | Aug. 2, 1910 |
| 992,164 | Christianson | May 16, 1911 |
| 1,074,862 | Hedley et al. | Oct. 7, 1913 |
| 1,380,732 | Miller | June 7, 1921 |
| 2,139,852 | Rossell | Dec. 13, 1938 |